United States Patent [19]

Bonnet

[11] 4,381,261
[45] Apr. 26, 1983

[54] STRUCTURALLY COLORED CROSS-LINKABLE COMPOUNDS, THEIR PREPARATION AND THEIR UTILIZATION IN COATING COMPOSITIONS

[75] Inventor: Evelyne J. M. Bonnet, Amfreville-sous-les-Monts, France

[73] Assignee: PCUK Produits Chimiques Ugine Kuhlmann, Courbevoie, France

[21] Appl. No.: 94,143

[22] Filed: Nov. 14, 1979

[30] Foreign Application Priority Data

Nov. 21, 1978 [FR] France ................ 78 32738

[51] Int. Cl.³ ............................................. C09B 29/22
[52] U.S. Cl. ..................... 260/162; 260/207.1;
260/205; 260/376; 260/377; 260/372; 260/380;
260/163; 544/182; 544/187; 544/215;
260/245.76
[58] Field of Search .................. 260/207.1, 376, 314.5, 260/162, 377, 205

[56] References Cited

U.S. PATENT DOCUMENTS 4,212,803 7/1980 Kruckenberg ............... 260/207.1 X
4,218,372 8/1980 Koerte ........................ 260/207.1 X
4,228,073 10/1980 Chapman et al. ............... 260/162 X

FOREIGN PATENT DOCUMENTS 2340443 2/1975 Fed. Rep. of Germany .

OTHER PUBLICATIONS

"Chemical Abstracts", 80, p. 74, #38395x, 1974.

Primary Examiner—Paul F. Shaver
Attorney, Agent, or Firm—Beveridge, DeGrandi & Kline

[57] ABSTRACT

Structurally colored cross-linkable compounds usable in coating compositions of the formula:

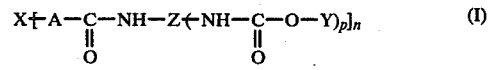

(I)

wherein A is a single bond, an oxygen atom or an

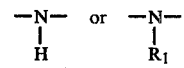

group, $R_1$ being an alkyl group containing 1 to 6 carbon atoms, β-cyanoethyl, methoxymethyl, cyclohexyl, phenyl, tolyl, xylyl, monochlorophenyl or dichlorophenyl; X is the residue of a dye of the formula $X(COOH)_n$ or $X(AH)_n$; Z is the residue of a polyisocyanate $Z+N=C=O)_{p+1}$; Y is the residue of a hydroxyl compound YOH bearing q groups having a polymerizable ethylenic double bond; p is 1 or 2; n is a whole number from 1 to 4; and q is a whole number from 1 to 7, are disclosed together with methods for their preparation, their use in coating compositions and the coatings obtained thereby.

7 Claims, No Drawings

STRUCTURALLY COLORED CROSS-LINKABLE COMPOUNDS, THEIR PREPARATION AND THEIR UTILIZATION IN COATING COMPOSITIONS

The present invention relates to new structurally colored cross-linkable compounds which can be used in particular for the realization of colored coatings on various supports (metal, paper, wood, textile materials, etc.). The invention also relates to methods of preparation of such compounds, coating compositions containing such compounds as constituents and coatings obtained with the aid of such compounds.

The realization of colored coatings on various supports by the application to these supports of a colored composition, followed by drying and thermo-cross-linking has been known for a long time. This technique presents inconveniences: cumbersome plants, large energy consumption owing to the need of eliminating the solvent and of heating the support and coating, possible decomposition of the support in the course of treatment or at the very least alteration of certain of its properties, and problems of safety and of toxicity associated with the use of certain solvents.

Consequently it has been suggested to substitute thermo-cross-linking by photo-cross-linking (cross-linking under the effect of UV radiation) which appreciably reduces the above-described inconveniences. However, irrespective of whether photo-cross-linking or thermo-cross-linking is used, the colored coating compositions used up to the present contain, in the form of different entities, on the one hand an uncolored cross-linkable polymer and on the other hand a pigmentary dye, which presents the following inconveniences:

1. The need of converting the dye into pigmentary form, an operation which is often difficult, lengthy and costly.
2. During the storage of the compositions the dispersed pigment may separate or alter (crystallization, change of physical form, etc.).
3. The pigment remains chemically independent of the coating after cross-linking and may thus migrate, with consequent loss of quality of the coating and possible problems of toxicity.
4. In the course of photo-cross-linking the solid pigment particles absorb an appreciable quantity of luminous energy, which makes it necessary to increase the time of irradiation and/or the quantity of photo-initiator in the compositions (the increase in the quantity of photo-initiator, moreover, has a very unfavorable influence on the storage stability of the compositions and diminishes slightly the quality of the coating as a result of the heterogeneity caused by photo-initiator residues).

It has now been found in accordance with the present invention, that it is possible to obtain colored coating compositions which do not present the above inconveniences and which give coatings of better quality than those obtained with the conventional prior art compositions. These new compositions are characterized in that they contain as constituents one or more structurally colored compounds, that is to say compounds which comprise, as an integral part of their chemical structure, chromophoric groupings imparting color, and which are cross-linkable, and correspond to the general formula:

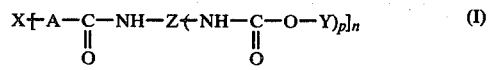

wherein A represents a single bond, an oxygen atom or an

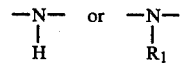

group wherein $R_1$ is an alkyl group containing 1 to 6 carbon atoms, $\beta$-cyanoethyl, methoxymethyl, cyclohexyl, phenyl, tolyl, xylyl, monochlorophenyl or dichlorophenyl; X represents, when A is a single bond, the residue of a dye of the formula $X(COOH)_n$ and, when A is an oxygen atom or an

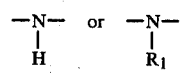

group, the residue of a dye of the formula $X(AH)_n$; Z represents the residue of a polyisocyanate of the formula $Z\text{-}(N\!=\!C\!=\!O)_{p+1}$; Y represents the residue of a hydroxyl compound of the formula YOH bearing q groups which have a polymerizable ethylenic double bond, wherein q may be from 1 to 7; p is a whole number equal to 1 or 2; and n is a whole number from 1 to 4.

In the above formula (I) the product $n \times p \times q$ is preferably greater than 1, that is to say the compounds of formula (I) preferably contain several groups with polymerizable ethylenic double bond. In this same formula, A is preferably a single bond, an oxygen atom or an

group, p is preferably equal to 1 and q is preferably equal to 1, 2 or 3.

The compounds of formula (I) are new and as such form a part of the present invention.

It is already known (see, for example, the Encyclopaedia of Polymer Science and Technology, 1971, 15, 314–319; French Pat. Nos. 2,208,947 and 2,280,672; and DOS No. 2,533,431) that polymers may be structurally colored, but these polymers do not carry groups with a polymerizable ethylenic double bond and thus are not cross-linkable.

Moreover, structurally colored cross-linkable polymers on the basis of monomers of the acrylic type are known from Dutch Patent application No. 78 00929 published Aug. 1, 1978. It is difficult to introduce into such polymers large quantities of dyes. Moreover, when using such polymers in coating compositions, it is necessary to dilute them with monofunctional acrylic monomers (for example 2-hydroxyethyl acrylate) which have a disagreeable odor and which are toxic and attack the skin.

The compounds of general formula (I) may be prepared by two methods.

In the first method, the so-called one-stage method, a dye of the formula $X(COOH)_n$ or $X(AH)_n$, a polyisocyanate of the formula $Z\text{-}(N\!=\!C\!=\!O)_{p+1}$ and a hydroxyl derivative of the formula YOH are made to react together, the three compounds being used in stoichiometric proportions, that is to say for one mole of the dye X(AH)$_n$ or X(COOH)$_n$, n moles of polyisocyanate Z$+$N=C=O)$_{p+1}$ and n×p moles of hydroxyl derivative YOH are used. The reaction is carried out in the presence of a radical polymerization inhibitor (hydroquinone, Cu$_2$O, etc.), at atmospheric pressure, and preferably at a temperature of 50°C. to 100°C. and in the presence of a catalyst known to accelerate the reaction between the —N=C=O groups and the hydroxy, amino or carboxy groups. Such catalysts include, for example, dibutyltin dilaurate, dibutyltin diacetate and triethylene diamine. The reaction between the three compounds may be effected in mass (that is to say without the addition of a solvent), in which case the dye is previously finely dispersed in the medium, or preferably in the presence of an organic solvent of the dye which is unreactive towards —N=C=O groups. Such solvents include, for example, N,N-dimethylformamide and toluene. When the reaction is completed, the solvent is eliminated, for example, by distillation under vacuum.

In the second method, the so-called two-stage method, in a first stage (stage a) the dye of the formula X(AH)$_n$ or X(COOH)$_n$ is reacted with the polyisocyanate of the formula Z$+$N=C=O)$_{p+1}$. In the case where n is greater than 1 the two compounds are preferably employed in stoichiometric proportions, that is to say for one mole of dye X(AH)$_n$ or X(COOH)$_n$, n moles of polyisocyanate are used. In the case where n is equal to 1 preferably an excess of polyisocyanate in relation to dye is used, for example 1.5 moles of polyisocyanate for 1 mole of dye. The reaction is carried out in mass, in which case the dye is previously finely dispersed in the medium, or preferably in the presence of an organic solvent for the dye which is unreactive towards —N=C=O groups. It is effected at atmospheric pressure and preferably at a temperature of 50°C. to 100°C. and in the presence of a catalyst known to accelerate the reaction between the —N=C=O groups and the hydroxy, amino or carboxy groups.

In a second stage (stage b) a hydroxyl derivative of formula YOH is made to react in situ (that is to say without separation of the intermediate compound) upon the intermediate compound obtained stage a. To this end the compound YOH is introduced into the reaction medium obtained at the end of stage a in stoichiometric quantities, that is to say for one mole of dye X(AH)$_n$ or X(COOH)$_n$ used in stage a, n×p moles of hydroxyl derivative YOH are introduced during stage b. Stage b is effected in the presence of a radical polymerization inhibitor. The operating conditions (pressure, temperature, catalyst) are otherwise the same as in stage a.

The intermediate compounds formed in stage a, compounds corresponding to the general formula:

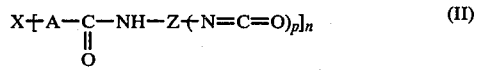

(II)

wherein X, A, Z, p and n have the same significance as in formula (I), are new and as such for a part of the present invention. They may be separated from the reaction medium obtained at the end of stage a by eliminating the solvent by distillation under reduced pressure.

For the preparation of compounds of formula (I) it is preferred to use the two-stage method.

The dyes of formulas X(AH)$_n$ and X(COOH)$_n$, from which is derived the X residue in formula (I), may belong to the most diverse classes such as azo, anthraquinone, perinone classes, derivatives of perylene tetracarboxylic acid, phthalocyanines, dioxazines, quinacridones, quinophthalones, thiazines, derivatives of triphenylmethane and methine dyes. The AH or COOH group or groups may be fixed directly to a ring, aromatic or other, of the dye molecule, or they may form part of lateral chains fixed to these rings. Examples of such lateral chains include —NH—CH—CH$_2$OH,

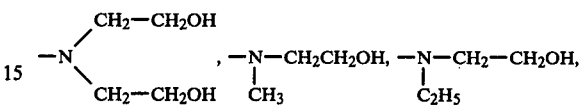

—SO$_2$NH$_2$, —CH$_2$—NH$_2$, —CH$_2$—OH,

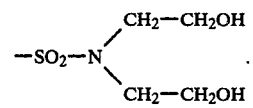

The choice of dye used is effected as a function of the shade and of the fastnesses desired and by bearing in mind the compatibility of the physico-chemical and chemical characteristics of the dye with the planned usage. Preferably dyes with a strong tinctorial strength and a good fastness to light are used. Examples of usable dyes include the following dyes, among other:

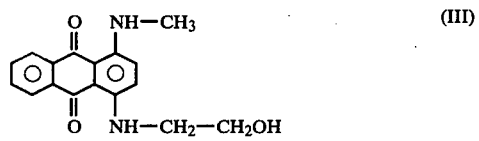

(III)

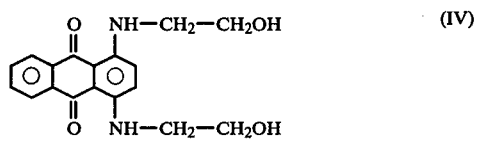

(IV)

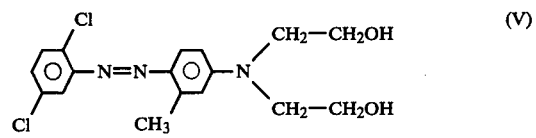

(V)

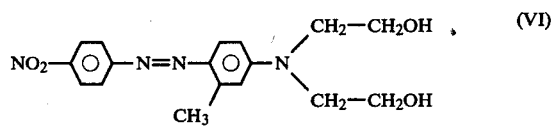

(VI)

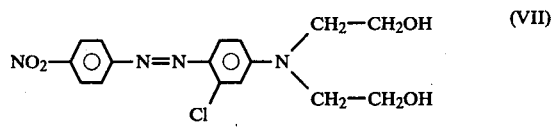

(VII)

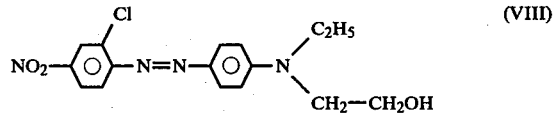

(VIII)

-continued
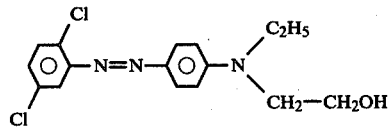 (IX)
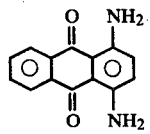 (X)
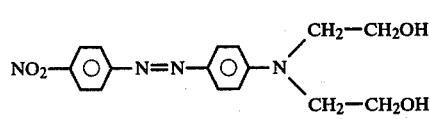 (XI)
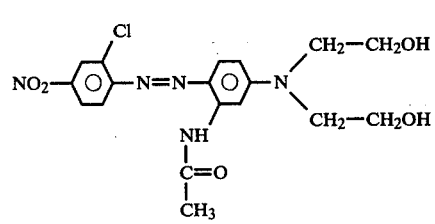 (XII)
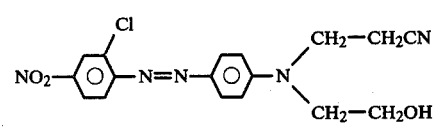 (XIII)
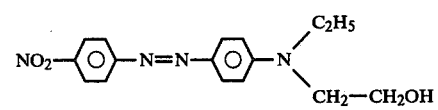 (XIV)
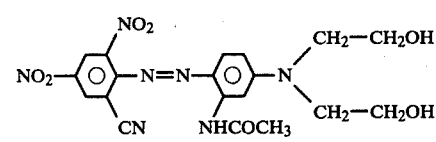 (XV)
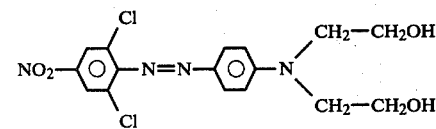 (XVI)
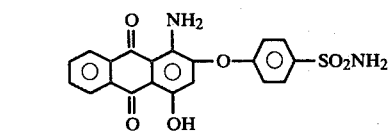 (XVII)
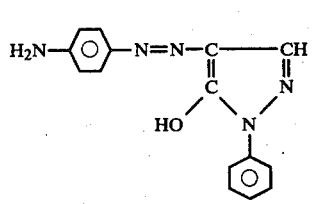 (XVIII)
-continued
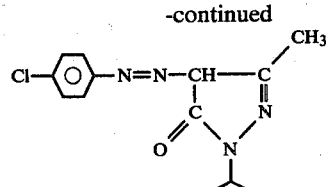 (XIX)
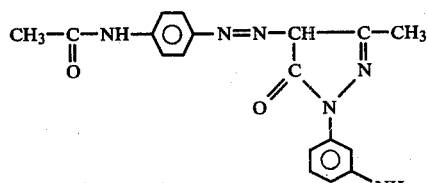 (XX)
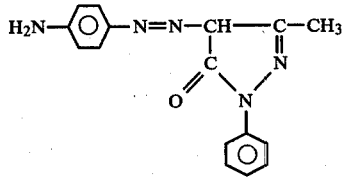 (XXI)
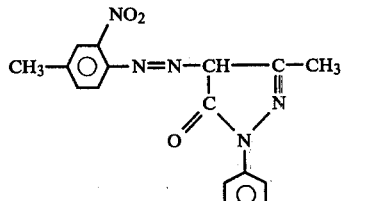 (XXII)
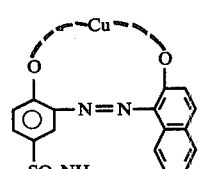 (XXIII)
the phthalocyanines deriving from copper phthalocyanine through the substitution of one or more hydrogen atoms of the aromatic nuclei by
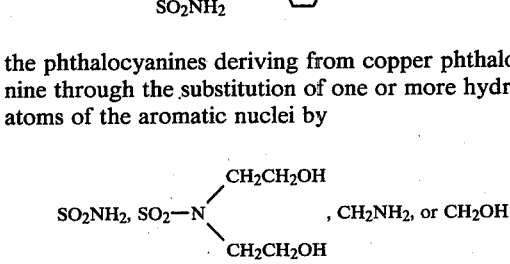
groups, and in particular the phthalocyanines of the formulae:
Pc(Cu) (SO₂NH₂)ₓ
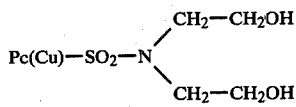
Pc(Cu) (CH₂NH₂)ₓ
Pc(Cu) (CH₂OH)ₓ wherein x is a whole number from 1 to 4 and Pc(Cu) designates the copper phthalocyanine residue.

The polyisocyanates of formula $Z\text{-}(N\text{=}C\text{=}O)_{p+1}$ from which is derived residue Z of formula (I), may belong to the aliphatic, alicyclic or aromatic series. Among these may be mentioned 1-chloro-2,4-bis-(isocyanato) benzene, m-phenylenediisocyanate, p-phenylenediisocyanate, 4,4'-methylene bis(-phenylisocyanate), tolylene-2,4-diisocyanate [or 2,4-bis(isocyanate) toluene], tolylene-2,6-diisocyanate [or 2,6-bis(isocyanate) toluene], mixtures of the last two compounds, in particular one containing 60% by weight of tolylene-2,4-diisocyanate and 40% by weight of tolylene-2,6-diisocyanate, 3-isocyanatomethyl-3,5,5-trimethyl-1-isocyanato cyclohexane, 3-3'-dimethyl-4,4'-bis(isocyanato) biphenyl, hexamethylene-1,6-diisocyanate, 2,2,4-trimethyl-1,6-bis(isocyanato) hexane, 4,4'-methylene bis(cyclohexylisocyanate), the diisocyanate derived from dimerized fatty acids and their mixtures, such as for example the mixtures of isomeric diisocyanates of the general formula $O\text{=}C\text{=}N\text{—}C_{36}H_{72}\text{—}N\text{=}C\text{=}O$ known under the commercial name DDI 1410, urethane compounds with isocyanate end groups obtained by addition of the above-described diisocyanates to monoalcohols or polyols, the triisocyanates of formulae:

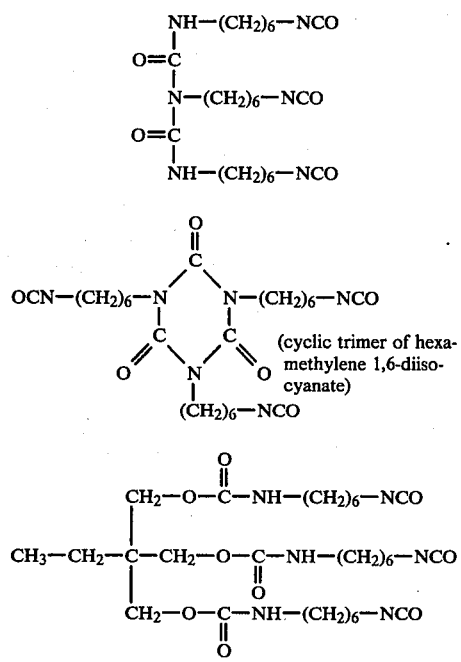

(cyclic trimer of hexamethylene 1,6-diisocyanate)

As groups having a polymerizable ethylenic double bond present on the Y residue of formula (I) may be cited the groups of formula

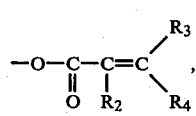

wherein $R_2$, $R_3$ and $R_4$ are the same or different and represent hydrogen atoms or methyl groups, in particular the group

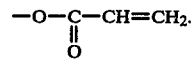

The hydroxyl compounds of formula YOH, from which is derived the residue Y of formula (I), are preferably chosen from among the esters corresponding to the general formula:

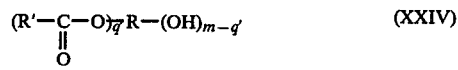  (XXIV)

wherein m is a whole number from 2 to 8, preferably from 3 to 6, q' is a whole number at least equal to 1 and at most equal to m−1, preferably 1, 2 or 3, R is the residue of a saturated polyol of the formula $R(OH)_m$ and R' is either a group of the formula:

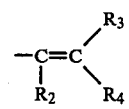

wherein $R_2$, $R_3$ and $R_4$ have the significances defined above, in particular a —CH=CH$_2$ group, or a radical, free of carboxyl groups, bearing one or two groups of the formula:

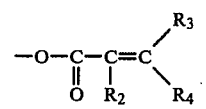

in particular one or two

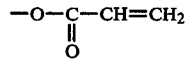

groups.

The compounds of formula (XXIV) result from the partial esterification of a saturated polyol of the formula $R(OH)_m$ with an ethylenically unsaturated monocarboxylic acid of the formula R'COOH. Among polyols of the formula $R(OH)_m$ may be cited diols such as ethylene glycol, propylene glycol, 1,4-, 1,3- and 2,3-butanediols, 1,6-hexanediol, neopentyl glycol, diethylene glycol, dipropylene glycol, dibutylene glycol, polypropylene glycols and polyethylene glycols, triols such as glycerol, trimethylolethane and trimethylolpropane, tetrols such as pentaerythritol and α-methyl glucoside, pentols such as pinitol and quebrachitol, hexols such as dipentaerythritol, inositol, mannitol and sorbitol, polyhydroxyl compounds obtained by condensation of ethylene oxide or propylene oxide with the diols, triols, tetrols, pentols and hexols cited above and more generally the polyhydroxyl compounds resulting from the oxyalkylation of polyols with alkylene oxides, in particular ethylene oxide and propylene oxide.

As acids of the formula

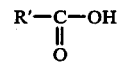

may be cited, among others, acrylic and methacrylic acids, the compounds resulting from the esterification of one mole of a hydroxyalkyl acrylate or methacrylate, for example 2-hydroxyethyl acrylate or 2-hydroxypropyl acrylate, with one mole of a saturated or unsaturated dicarboxylic acid or its anhydride, for example adipic acid or maleic anhydride, and the compounds resulting from the esterification of two moles of a hydroxyalkyl acrylate or methacrylate with one mole of a tricarboxylic acid or its anhydride, for example trimellitic acid or anhydride, The structurally colored cross-linkable compounds of formula (I) may be preserved after having been stabilized through the addition of a radical polymerization inhibitor, for example hydroquinone, in order to prevent premature polymerization. They are compatible with themselves, that is to say that several compounds, for example of different shade of color, may be mixed so as to obtain composite shades. In contrast to the structurally colored cross-linkable polymers of Dutch application 78 00929, it is easy to realize compounds of formula (I) in which the residue X of the dye represents a very high percentage by weight (for example 50%) of the molecule.

Owing to the presence in their molecule of one or several groups with polymerizable ethylenic double bond, the compounds of formula (I) are cross-linkable, that is to say apt to form three-dimensional polymers by polymerization. Except for compounds of formula (I) having only one group with polymerizable ethylenic double bond, in which case it is necessary to add for the cross-linking an uncolored compound containing several groups with polymerizable ethylenic double bond, the cross-linking of compounds of formula (I) does not necessitate the addition of any other compound possessing polymerizable ethylenic double bonds. The cross-linking of compounds of formula (I) takes place under the following conditions:

1. By heating, preferably in the absence of oxygen, to a temperature between 50° C. and 250° C., preferably between 50° C. and 150° C.;
2. From 40° C. and higher temperatures in the presence of a radical polymerization initiator, or even at a lower temperature if an accelerator is added;
3. By exposure to visible or ultraviolet light in the presence of a photosensitizer or photoinitiator; or
4. By exposure to an ionizing radiation of electromagnetic or corpuscular nature ($\gamma$-rays, X-rays, accelerated electrons) in the presence or absence of air. No initiator or sensitizer is then necessary.

The compounds of formula (I) may be used as constituents of cross-linkable compositions for coatings. When they are incorporated in such compositions they impart to them simultaneously film-forming character, adhesiveness on the support, color and its permanence. The utilization of compounds of formula (I) in coating compositions does not necessitate the addition of monofunctional acrylic monomers.

The compositions for coating in accordance with the invention contain at least 10% by weight of one or more compounds of formula (I). They may contain up to 100% by weight of such compounds, on condition however, that the cross-linking can be accomplished without the addition of uncolored compound having several polymerizable ethylenic double bonds. In addition to the compound or compounds of formula (I) the coating compositions in accordance with the invention may contain in particular:

1. A radical polymerization initiator or photoinitiator;
2. Polyfunctional olefinically unsaturated monomers (that is to say with several polymerizable ethylenic double bonds), for example trimethylolpropane triacrylate, pentaerythritol tetracrylate, pentaerythritol triacrylate or hexanediol diacrylate;
3. Inert organic solvents, i.e., solvents which are noncopolymerizable and which are not opposed to cross-linking, for example methylethyl ketone or N,N-dimethylformamide;
4. Inert plasticizers, for example dioctyl phthalate;
5. Inert polymers such as waxes;
6. Uncolored copolymerizable compounds such as the products resulting from the action of pentaerythritol triacrylate upon tolylene diisocyanate known under the trade names of Sétalin AP 560 and Sétalin AP 561, the compound of the formula:

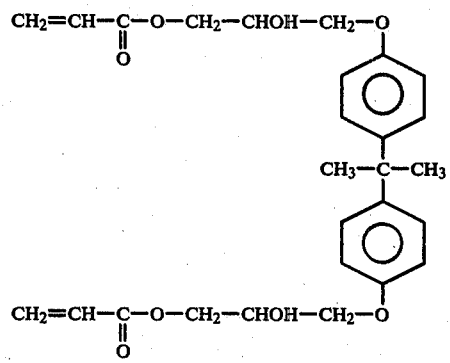

the compounds obtained by condensation with elimination of water of one mole of adipic acid or of a long-chain fatty acid with two COOH groups with two moles of pentaerythritol triacrylate, or again compounds of the formulae:

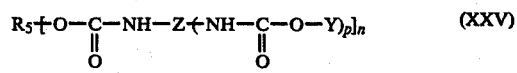 (XXV)

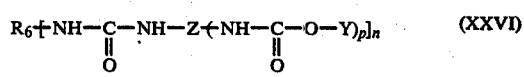 (XXVI)

wherein n, p, Z and Y have the same significance as in formula (I), $R_5$ is the residue of an alcohol of the formula $R_5(OH)_n$ and $R_6$ is the residue of an amine of the formula $R_6(NH_2)_n$.

As alcohols of formula $R_5(OH)_n$ may be cited in particular the polyols with two, three or four OH groups recited above for $R(OH)_m$. As amines of formula $R_6(NH_2)_n$ may be cited the alkylenediamines with 2 to 10 carbon atoms and the phenylenediamines, in particular hexamethylene diamine, decamethylene diamine and p-phenylenediamine.

The compounds of formulae (XXV) and (XXVI) may be prepared by identical processes to those used for the preparation of the compounds of formula (I), substituting at the start the dye $X(AH)_n$ or $X(COOH)_n$ by an alcohol of the formula $R_5(OH)_n$ or an amine of the formula $R_6(NH_2)_n$.

It is possible to prepare directly binary mixtures containing a compound of formula (I) and a polyfunctional olefinically unsaturated monomer, binary mixtures containing a compound of formula (I) and a compound of formula (XXV) or (XXVI), and ternary mixtures containing a compound of formula (I), a compound of formula (XXV) or (XXVI) and a polyfunctional olefinically unsaturated monomer, by adding to the reaction medium of the processes of preparation of compounds (I) a polyfunctional olefinically unsaturated monomer which is non-reactive towards N=C=O groups (for example pentaerythritol tetracrylate) and/or by substituting in these same processes a portion of the dye X(AH)$_n$ or X(COOH)$_n$ by an alcohol R$_5$(OH)$_n$ or an amine R$_6$(NH$_2$)$_n$. The binary or ternary mixtures containing a polyfunctional olefinically unsaturated monomer are usable directly for carrying out the coating, possibly after the addition of a photoinitiator or radical polymerization initiator, if the mode of cross-linking used requires it.

The coating compositions prepared with the compounds of formula (I) produce, for example on aluminum, paper, cardboard or fabric, coatings of a very great homogeneity of coloration and of a very high degree of transparency. They present moreover, by comparison with the traditional cross-linkable compositions used, great advantages with regard to ease of preparation.

In fact, the photo-cross-linkable compositions, like the traditional photo-cross-linkable inks, normally contain five types of constituents, viz.:
1. An uncolored polymer base possessing polymerizable ethylenic double bonds;
2. Mono or polyfunctional acrylic monomers (that is to say monomers possessing one or more polymerizable ethylenic double bonds);
3. One or more photoinitiators;
4. One or more adjuvants; and
5. A pigment.

The incorporation of the pigment is always an operation difficult to realize and delicate, since it may be associated with an evolution of the pigment in an unfavorable direction (loss of coloring power, alteration of color shade) or with a disturbance of the physico-chemical characteristics of the mixture (change in viscosity, etc.). Furthermore, the properties of the coatings obtained after cross-linking are frequently very sensitive to slight modifications of formulation and it is therefore necessary to carry out a great number of tests to determine the optimum proportions of the various constituents.

In the case of cross-linkable compositions prepared with the aid of compounds of formula (I), the difficulties of preparation associated with the incorporation of a pigment are avoided, since the basic pair of uncolored polymer-pigment is replaced by a single entity, that is to say a structurally colored cross-linkable compound in accordance with the invention and, since the latter are very soluble in the polyfunctional acrylic monomers, a very rapid homogenization of the compositions is achieved.

Furthermore, the yield of the photo-cross-linking process is improved in the case of photo-cross-linkable compositions in accordance with the invention, which allows the use of smaller quantities of photoinitiator than in the case of the traditional photo-cross-linkable compositions.

The following examples, wherein the parts specified are by weight, illustrate the invention without limiting it.

EXAMPLE 1

Into a 500 ml glass reactor fitted with a stirrer and a thermometer and dipping into a temperature-controlled bath are introduced 18.5 parts by weight of the orange dye of formula (V), dissolved in 200 parts of anhydrous N,N-dimethylformamide. Then 17 parts of hexamethylene 1,6-diisocyanate are added.

The reaction is effected at 90° C. in the presence of traces of dibutyltin dilaurate. Its progress is followed by the determination of the remaining —N=C=O groups by acid-base titration.

When 50% of the N—C—O groups have disappeared, 45 parts of a mixture A containing approximately 65% by weight of pentaerythritol triacrylate, 35% by weight of pentaerythritol tetracrylate and 0.01 part of hydroquinone are added.

When more than 90% of the —N=C=O groups have disappeared, 5 parts of anhydrous ethanol are added in order to destroy the residual —N=C=O groups. When all the —N=C=O groups have reacted, the solvent is eliminated by distillation under a pressure of 20 mm of mercury.

In this manner a strongly colored, orange, and very viscous composition is obtained containing pentaerythritol tetracrylate and approximately 80% of the compound of the formula:

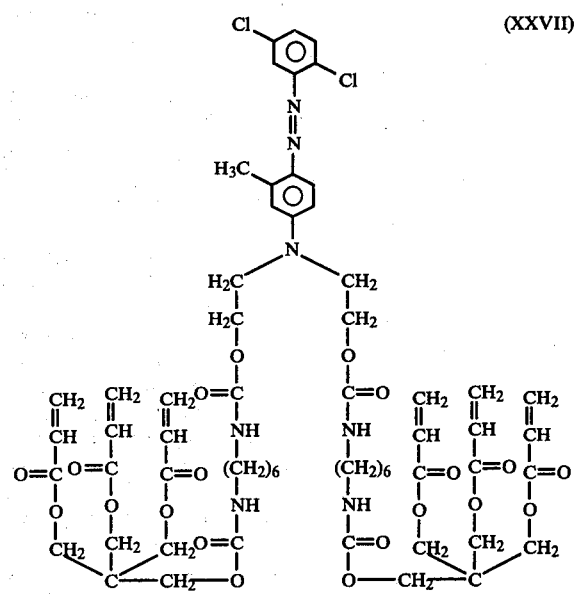

(XXVII)

If in the above process the 45 parts of mixture A are substituted by 29.2 parts of pentaerythritol triacrylate, a product consisting essentially of the compound of formula (XXVII) is obtained.

EXAMPLE 2

Into the same reactor as that used in Example 1 are introduced 16.3 parts of the blue dye of formula (IV) dissolved in 200 parts of anhydrous N,N-dimethylformamide, and 17 parts of hexamethylene 1,6-diisocyanate are added.

The reaction is effected at 90° C. in the presence of traces of dibutyltin dilaurate. Its progress is followed by determination of the remaining —N=C=O groups by acid-base titration.

When 50% of the —N≡C≡O groups have disappeared, 45 parts of the mixture A of Example 1 and 0.01 part of hydroquinone are added.

When more than 90% of the —N≡C≡O groups have disappeared, 5 parts of anhydrous ethanol are added in order to destroy the residual —N≡C≡O groups.

When all the —N≡C≡O groups have reacted, 20 parts of trimethylolpropane triacrylate are added to the mixture, then the solvent is eliminated by distillation under a pressure of 20 mm mercury.

In this manner a strongly colored, blue, viscous composition is obtained containing trimethylolpropane triacrylate, pentaerythritol tetracyrlate and approximately 65% of the compound of the formula:

nate, 30 parts of mixture A of Example 1 and 0.01 part of hydroquinone are introduced.

The reaction is effected at 90° C. in the presence of traces of dibutyltin dilaurate during 8 hours.

Then 15 parts of the mixture A of Example 1 are added and the temperature is maintained at 90° C. for 4 hours. At the end of this period 5 cc of anhydrous ethanol are added. The ethanol is allowed to react for ½ hour at 70° C., then the excess ethanol is eliminated by distillation under a pressure of 20 mm mercury.

In this manner a homogenous viscous composition is obtained with an absolute viscosity, measured on the Laray viscosimeter at 25° C., of 180 Poise. This composition contains the compound of formula (XXVII). It can be printed onto paper with the help of a printing test apparatus IGT.

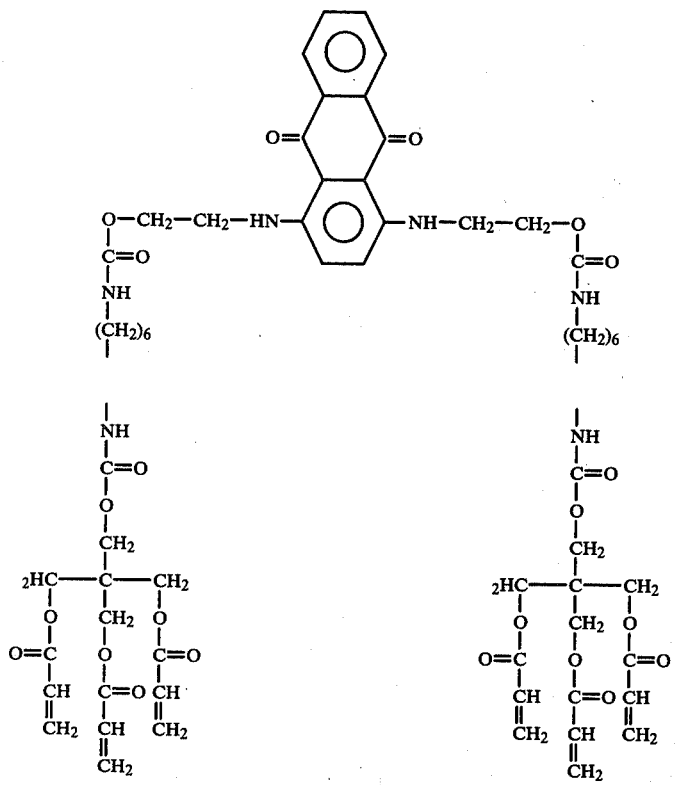

(XXVIII)

If in the above process the 45 parts of mixture A are substituted by 29.2 parts of pentaerythritol triacrylate and no trimethylolpropane triacrylate is added, finally a product consisting essentially of the compound (XXVIII) is obtained.

EXAMPLE 3

Into a glass reactor holding 100 ml and fitted with a stirrer, a thermometer and dipping into a temperature-controlled bath a fine dispersion of 18.5 parts of the dye of Example 1 in 17 parts of hexamethylene 1,6-diisocya-

EXAMPLE 4

The mode of operation of Example 1 is repeated, replacing the 17 parts of hexamethylene 1,6-diisocyanate by 18 parts of a mixture of tolylene diisocyanates containing 60% by weight of the 2,4 isomer and 40% by weight of the 2,6 isomer (mixture B).

A strongly colored, orange, viscous composition is obtained containing pentaerythritol tetracrylate and 80% of compounds of formula:

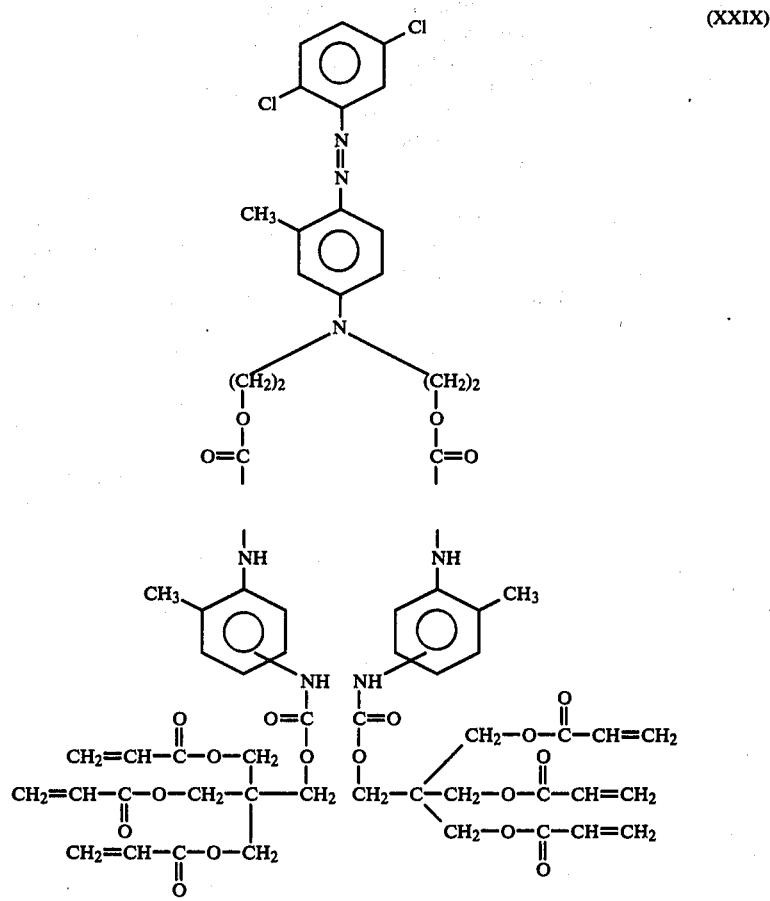

(XXIX)

EXAMPLE 5

Into a 500 ml glass reactor fitted with a stirrer, a thermometer and dipping into a temperature-controlled bath are introduced 33.8 parts of the dye of formula (IX) previously dissolved in 300 ml of anhydrous toluene by heating under reflux. After cooling to 50° C., 25.2 parts of hexamethylene 1,6-diisocyanate are added rapidly.

The mixture is allowed to react for 6 hours at 90° C. in the presence of traces of dibutyltin diacetate, then 7 parts of the product known under the trade name UGI-POL 3130 (oxyethylated glycerol with a hydroxyl index of 400 and a molecular weight of 420) are added. After 2 hours of reaction 70 parts of the mixture A of Example 1 and 0.02 parts of the methylether of hydroquinone are added.

When more than 90% of the —N=C=O groups have disappeared, 5 parts of ethanol are added in order to eliminate the residual —N=C=O groups. After ½ hour of reaction at 70° C., 40 parts of trimethylolpropane triacrylate are added, then the solvent is eliminated by distillation under a pressure of 20 mm mercury.

The composition so obtained, of orange color, possesses an absolute viscosity of 140 Poise at 25° C. (measured on the Loray viscosimeter) and can be printed onto paper with the help of a printing test apparatus IGT.

This composition contains in particular trimethylolpropane triacrylate, pentaerythritol tetracrylate and the compound of the formula:

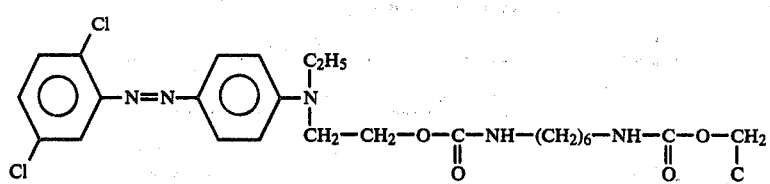

(XXX)

EXAMPLE 6

Into the same reactor as that used in Example 1, 17.8 parts of the dye of formula XIX, dissolved in 180 parts of N,N-dimethylformamide are introduced and 13 parts of the mixture of tolylene diisocyanates of Example 4 (mixture B) are added.

The mixture is allowed to react for 3 hours at 90° C. in the presence of traces of triethylene diamine, then 45 parts of the mixture A of Example 1 and 0.01 part of hydroquinone are added.

After 4 hours of reaction at 90° C. 5 parts of absolute ethanol are added. The mixture is allowed to react for ½ hour at 70° C., then 5 parts of N-vinylpyrrolidone and 25 parts of trimethylolpropane triacrylate are added and the solvent is eliminated by distillation under a pressure of 20 mm mercury. A yellow viscous composition is obtained containing trimethylolpropane triacrylate, pentaerythritol tetracrylate and approximately 40% of compounds of the formula:

(XXXI)

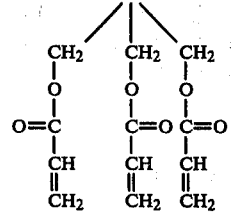

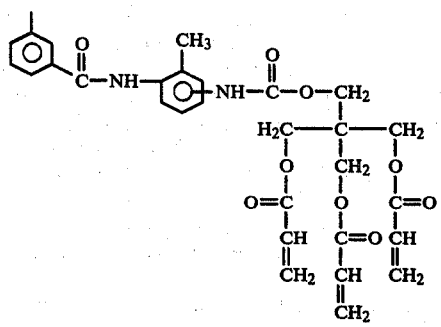

EXAMPLE 7

The procedure is the same as in Example 6, but the 17.8 parts of the dye of formula XIX are substituted by 17.5 parts of the dye of formula XX. A yellow viscous compositions is obtained containing approximately 40% of the compound:

(XXXII)

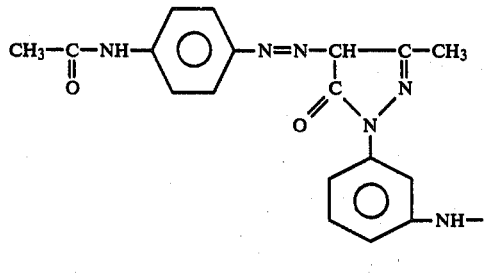

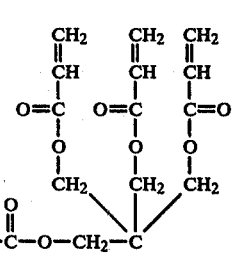

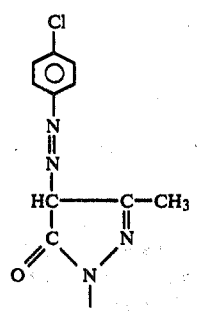

EXAMPLE 8

Into the same reactor as that used in the preceding examples are introduced 9 parts of the blue dye derived from copper phthalocyanine of the formula:

Pc Cu [SO$_2$—NH$_2$]$_3$ dissolved in 300 ml of anhydrous N,N dimethylformamide and 5 parts of hexamethylene 1,6-diisocyanate.

The reaction is effected at 80° C. without catalyst. Its progress ia followed by determination of the remaining —N═C═O groups. When 50% of the —N═C═O groups have disappeared, 20 parts of the mixture A of Example 1 and 0.05 part of the methylether of hydroquinone are added.

After 4 hours of reaction all the isocyanate functions have disappeared. Then 2.5 parts of N-vinyl pyrrolidone and 20 parts of trimethylolpropane triacrylate are added and then the solvent is eliminated by distillation under a pressure of 20 mm mercury.

The composition so obtained is of blue color and possesses an absolute viscosity of 220 Poise at 25° C. (measured on the Laray viscosimeter) and can be printed onto paper with the help of a printing test aparatus IGT.

EXAMPLE 9

Into the same reactor as that used in the preceding examples are introduced 23.8 parts of the violet dye of formula (X) dissolved in 200 parts of anhydrous N,N-dimethylformamide and 33.6 parts of hexamethylene 1,6-diisocyanate.

The reaction is effected at 80° C. without catalyst and its progress is followed by determination of the remaining —N=C=O groups. When 50% of the —N=C=O groups have disappeared, 90 parts of the mixture A of Example 1 and 0.01 part of the methylether of hydroquinone are added. After 4 hours of reaction at 90° C. all the isocyanate functions have disappeared. Then 5 parts of N-vinyl pyrrolidone and 45 parts of trimethylolpropane triacrylate are added and the solvent is eliminated by distillation under a pressure of 20 mm mercury.

In this manner a viscous composition of violet color is obtained containing trimethylolpropane triacrylate, pentaerythritol tetracrylate and approximately 60% of the compound of the formula:

EXAMPLES 10 TO 14

The procedure is as in Example 1, but in place of the 18.5 parts of dye (V) an equimolecular quantity of the dyes indicated in the following Table 1 is used. Viscous colored compositions are obtained with an absolute viscosity measured on the Loray viscosimeter from 100 to 400 Poise at 25° C. The compositions give good quality print on paper.

TABLE 1

| Example | Dye | Shade of color obtained |
|---|---|---|
| 10 | (VI) | Red |
| 11 | (VII) | Scarlet Red |
| 12 | (XVI) | Red-brown |
| 13 | (XII) | Red |
| 14 | (XV) | Intense blue |

EXAMPLES 15 AND 16

The procedure is an in Example 5, but in place of 33.8 parts of dye (IX) an equimolecular quantity of the dyes indicated below in Table 2 is used.

TABLE 2

| Example | Dye | Shade of color obtained |
|---|---|---|
| 15 | (XIII) | Red |
| 16 | (XIV) | Ruby |

EXAMPLES 17 TO 19

The procedure is as in Example 7, but in place of 17.5 parts of dye XX an equimolecular quantity of the dyes indicated below in Table 3 is used.

TABLE 3

| Example | Dye | Shade of color obtained |
|---|---|---|
| 17 | (XXI) | Yellow |
| 18 | (XXII) | Yellow |
| 19 | (XXIII) | Red |

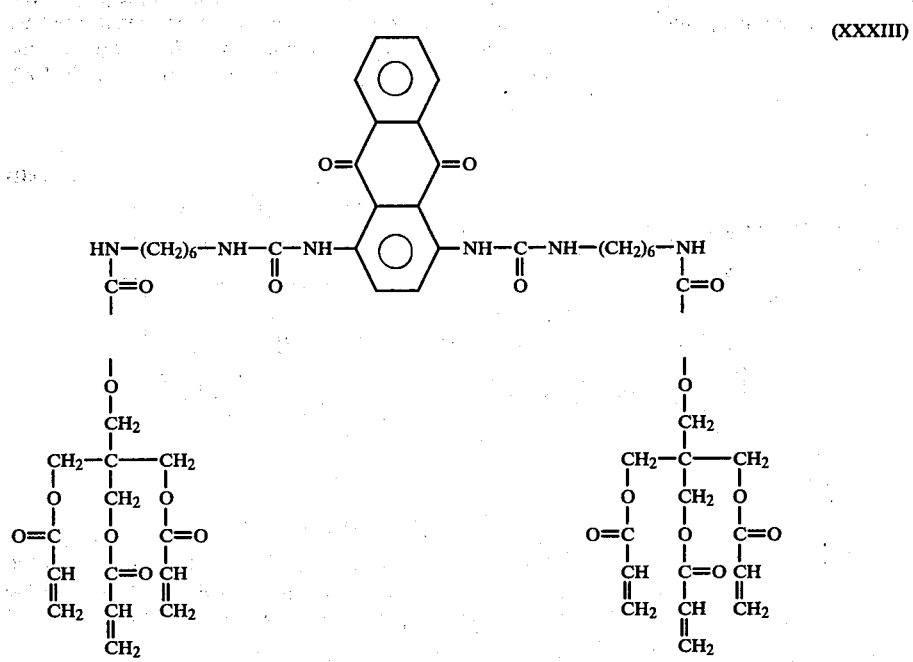

(XXXIII)

EXAMPLE 20

At a temperature below 60° C. a photo-cross-linkable composition is prepared with the aid of the colored composition obtained in Example 1. To this end 80 parts of the latter are mixed with 20 parts of trimethylolpropane triacrylate and 1.5 parts of monobutylether of benzoin (photoinitiator).

The homogeneous composition so obtained is applied to white paper in a layer of approximately 1μ thickness, with the help of a printing quality test apparatus IGT. The print is dried by photo-cross-linking in one pass at a speed of 40 m/mn under two UV lamps of 80 Watt/cm.

EXAMPLE 21

20 parts of the colored composition obtained in Example 4, 5 parts of 1,6-hexanediol diacrylate, 10 parts of trimethylolpropane triacrylate and 1 part of a mixture of benzophenone- Michler's ketone in a ratio of 6:1 by weight are mixed so as to obtain a homogeneous composition.

This composition is applied to paper in a layer of approximately 1μ thickness and dried by photo-cross-linking during one passage at a speed of 40 m/minute under two UV lamps of 80 Watt/cm.

EXAMPLE 22

Upon an aluminum foil is applied a film of 50μ thickness of the colored composition of Example 6, to which has previously been added 1% by weight of azo-bis-(isobutyronitrile) as a radical polymerization initiator. This film is hardened by heating to 120° C. for one-half hour.

EXAMPLE 23

Into the same reactor as that used in Exmaple 1 are introduced 20 parts of the colored composition of Example 4 dissolved in 80 parts of methylethyl ketone then, rapidly at a temperature of 78° C., a solution of 0.2 parts of azo-bis(isobutyronitrile) in 20 parts of methylethyl ketone. The mixture is maintained at 78° C. for an hour. The cross-linked product so obtained is filtered and dried. In this manner 19.5 parts of a colored cross-linked polymer are obtained which is insoluble in the majority of organic solvents.

EXAMPLES 24

The procedure is as in Example 23, except for substituting the methylethyl ketone by N,N-dimethylformamide and maintaining for 10 minutes at 90° C. (instead of 1 hour at 78° C.). The cross-linked product thus formed is filtered and dried. 15 parts of a cross-linked colored polymer insoluble in the customary organic solvents are obtained.

What is claimed is:

1. A structurally colored compound of the formula:

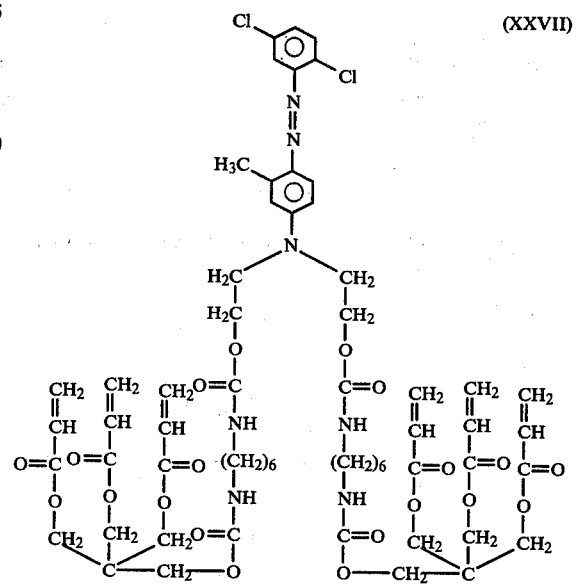

2. A structurally colored compound of the formula:

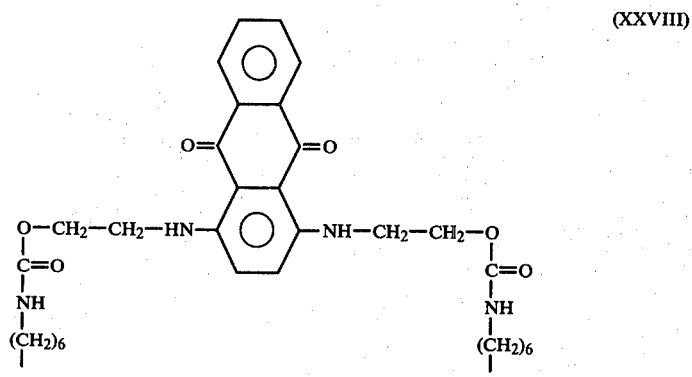

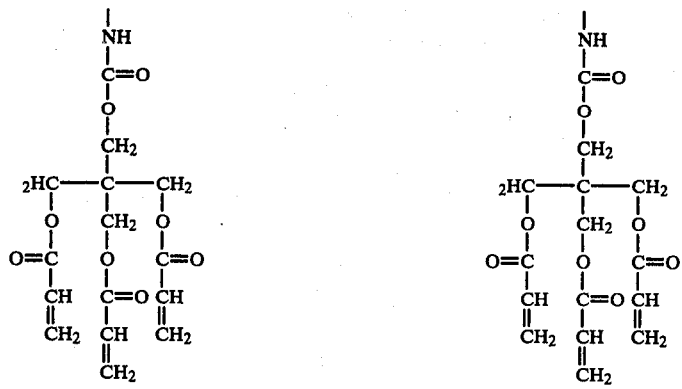
3. A structurally colored compound of the formula:
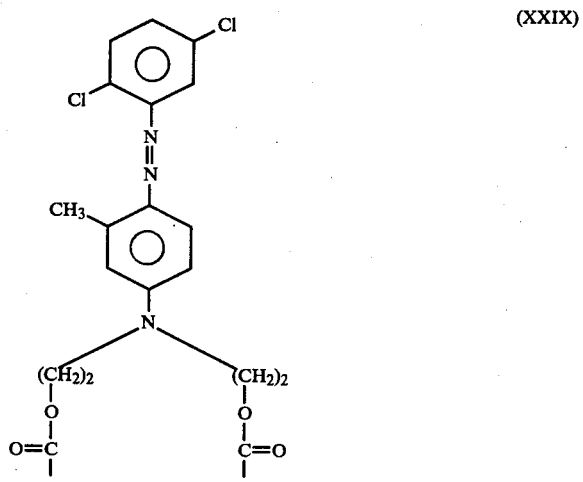
(XXIX)
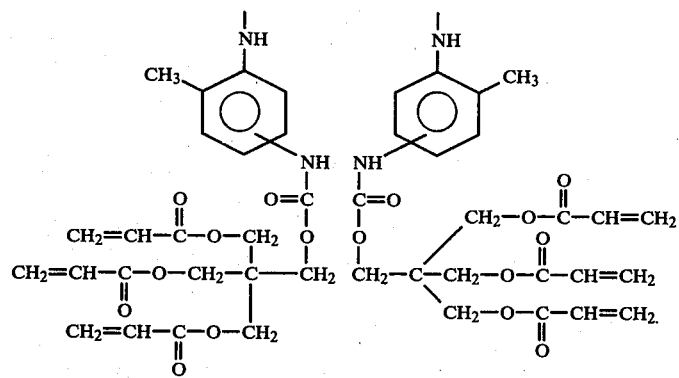
4. A structurally colored compound of the formula:

(XXX)
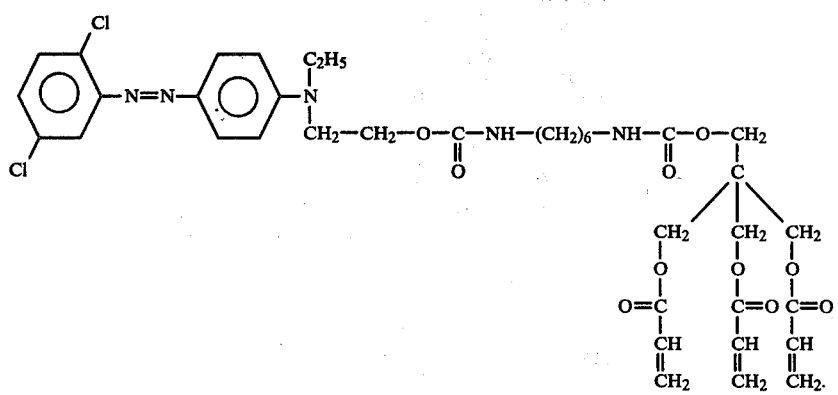
5. A structurally colored compound of the formula:
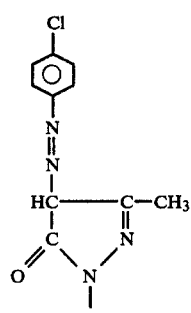
(XXXI)
-continued
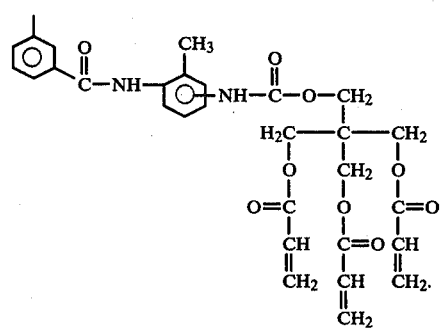
6. A structurally colored compound of the formula:
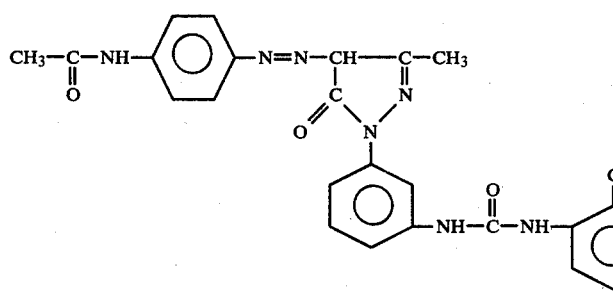
(XXXII)
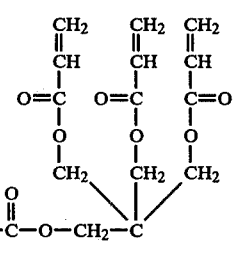
7. A structurally colored compound of the formula:
(XXXIII)
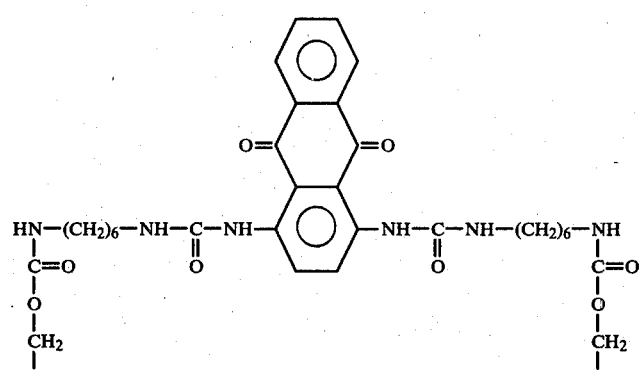

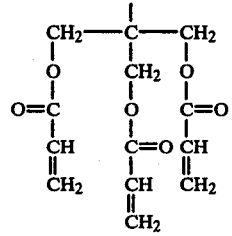
-continued
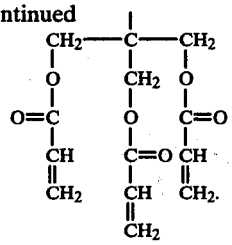
* * * * *